(12) United States Patent
Fulop et al.

(10) Patent No.: US 10,759,111 B2
(45) Date of Patent: Sep. 1, 2020

(54) SMART CART FOR THREE DIMENSIONAL BINDER JET PRINTERS

(71) Applicant: Desktop Metal, Inc., Burlington, MA (US)

(72) Inventors: Ricardo Fulop, Lexington, MA (US); Alexander Nicholas LeGendre, Boston, MA (US); Jonah Samuel Myerberg, Lexington, MA (US); Charles Edward Martin, Freedom, NH (US); Justin Cumming, Topsfield, MA (US); Robert Michael Shydo, Jr., Pelham, NH (US); George Hudelson, Billerica, MA (US); Jamison Go, Orlando, FL (US); Andrew E. Kuklinski, Arlington, MA (US); Michael Daniel Santorella, Boston, MA (US)

(73) Assignee: Desktop Metal, Inc., Burlington, MA (US)

( * ) Notice: Subject to any disclaimer, the term of this patent is extended or adjusted under 35 U.S.C. 154(b) by 284 days.

(21) Appl. No.: 15/921,903

(22) Filed: Mar. 15, 2018

(65) Prior Publication Data

US 2018/0297278 A1 Oct. 18, 2018

Related U.S. Application Data

(60) Provisional application No. 62/485,752, filed on Apr. 14, 2017.

(51) Int. Cl.
*B29C 64/165* (2017.01)
*B33Y 50/02* (2015.01)
(Continued)

(52) U.S. Cl.
CPC .......... *B29C 64/165* (2017.08); *B29C 64/176* (2017.08); *B29C 64/25* (2017.08);
(Continued)

(58) Field of Classification Search
None
See application file for complete search history.

(56) References Cited

U.S. PATENT DOCUMENTS

| 5,387,380 | A | * | 2/1995 | Cima | .......... | B05C 19/04 |
| | | | | | | 264/69 |
| 2012/0119399 | A1 | * | 5/2012 | Fruth | .......... | B29C 64/20 |
| | | | | | | 264/39 |

(Continued)

FOREIGN PATENT DOCUMENTS

WO 2016075025 A1 5/2016

OTHER PUBLICATIONS

International Search Report and Written Opinion for PCT/US2018/027570 dated Jul. 26, 2018 entitled "Smart Cart for Three Dimensional Binder Jet Printer".

*Primary Examiner* — Mary Lynn F Theisen
(74) *Attorney, Agent, or Firm* — Wiggin and Dana LLP; Jonathan D. Hall; Joseph Casino

(57) ABSTRACT

A build box associated with a powder bed fabrication system may comprise a housing defining a housing cavity, and a powder print bed disposed within the housing cavity. The powder print bed may be characterized by state information. The build box may further comprise a medium configured to facilitate access to the state information, and a coupling interface for removably engaging the build box with at least one subsystem of the powder bed fabrication system. The state information may comprise one or more state information elements of object identification, object location, current processing state, next subsystem processing step, previous subsystem processing step, object model information, (Continued)

object material composition, and current powder print bed temperature profile. The medium may comprise a memory device coupled with a transceiver. The medium may alternatively comprise an RFID device, or an optically perceivable designator, such as a bar code or QR code.

17 Claims, 7 Drawing Sheets

(51) Int. Cl.
*B33Y 10/00* (2015.01)
*B33Y 30/00* (2015.01)
*B29C 64/393* (2017.01)
*B33Y 40/00* (2020.01)
*B29C 64/259* (2017.01)
*B29C 64/255* (2017.01)
*B29C 64/176* (2017.01)
*B29C 64/25* (2017.01)

(52) U.S. Cl.
CPC .......... *B29C 64/255* (2017.08); *B29C 64/259* (2017.08); *B29C 64/393* (2017.08); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

| | | |
|---|---|---|
| 2016/0339640 A1 | 11/2016 | Juan |
| 2017/0087770 A1 | 3/2017 | Herzog |
| 2018/0001567 A1* | 1/2018 | Juan .................. B29C 64/295 |
| 2019/0286384 A1* | 9/2019 | Torrent ................ G06F 3/1229 |
| 2019/0289064 A1* | 9/2019 | Reber ..................... H04L 67/10 |

* cited by examiner

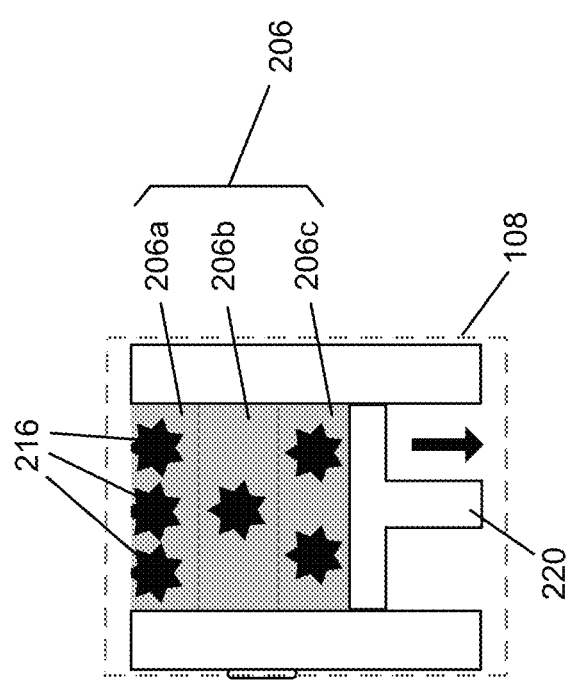

SMART CART FOR THREE DIMENSIONAL BINDER JET PRINTERS

RELATED APPLICATIONS

This application claims the benefit of U.S. Provisional Application No. 62/485,752, filed on Apr. 14, 2017. The entire teachings of the above application are incorporated herein by reference.

BACKGROUND

Powder bed three-dimensional (3D) fabrication is an additive manufacturing technique based on binding particles of a powder to form a 3D object. Binder jetting is one type of powder bed 3D fabrication. In binder jetting, a controlled pattern of the liquid binder is applied to successive layers of the powder in a powder bed such that the layers of the material adhere to one another to form a three-dimensional green part. Through subsequent processing, the three-dimensional green part can be formed into a finished 3D metal part.

A 3D fabrication system may comprise at least a printing subsystem, a build box (also known as job box) subsystem, a de-powdering subsystem and a sintering furnace. The build box subsystem may comprise a powder print bed with a constituent object therein. During the fabrication process, the constituent object may be in any of various stages of formation and/or processing. In a typical fabrication environment, multiple build boxes may be distributed across the active processing chain. There are generally few distinctions between different individual build box subsystems, so the operator/user of the binder jet fabrication system is responsible for keeping track of the contents of a particular build box subsystem and its processing status.

SUMMARY

In the described embodiments, a build box subsystem is associated with "state information" that characterizes certain aspects of the build box subsystem. The state information may be used by other components of the three dimensional (3D) fabrication system to track the objects or parts being manufactured within the build box, automatically determine suitability of the build box for upcoming procedural steps, automatically prevent improper procedural steps from being performed, and notify an operator of the 3D fabrication system if a processing anomaly exists. The state information may also be used by the 3D fabrication system to monitor aspects of the build box as it passes through the processing steps, and to track its location and the location of the unique parts contained within. The example embodiments of a 3D fabrication system described herein may be a binder jet fabrication system, although the described concepts may apply to other 3D fabrication systems such as laser-based and e-beam based 3D fabrication systems.

One useful aspect of associating accessible state information with the build box is the ability to track the actual objects or parts being manufactured, knowing which parts are contained within which build box, where the build box and the parts/objects being manufactured are located, and under which parameters the parts/objects were printed.

In one aspect, the invention may be a build box associated with a powder bed fabrication system. The build box may comprise a housing defining a housing cavity, and a powder print bed disposed within the housing cavity. The powder print bed may be characterized by state information. The build box may further comprise a medium configured to facilitate access to the state information, and a coupling interface for removably engaging the build box with at least one subsystem of the powder bed fabrication system.

In an embodiment, the state information may comprise one or more state information elements of (i) object identification, (ii) object location, (iii) object model information, (iv) object material composition state, (v) non-object material composition, (vi) object position/orientation, (vii) powder bed density, (viii) part quantity, (ix) packed density, (x) current processing, (xi) next subsystem processing step, (xii) previous subsystem processing step, (xiii) beginning to end process flow, (xiv) failure status, (xv) temperature profile, and (xvi) pressure profile.

The medium may be a memory device configured to store a data block that represents the state information. The build box may further comprise a communications interface configured to convey the data block to one or more subsystems of the powder bed fabrication system. The data block may comprise one or more data fields, each of which is configured to contain one of the state information elements. The data block may comprise a pointer field configured to contain information that points to one or more of the state information elements stored in a remote memory device within the powder bed fabrication system. The communications interface may be a wireless connection to the one or more subsystems of the powder bed fabrication system. The communications interface may be an electrical connector configured to mechanically and electrically mate with a corresponding electrical connector associated with the one or more subsystems of the powder bed fabrication system. The communications interface may be an optical connection, such as camera or other imager configured to read a bar code or QR code.

In one embodiment the powder print bed comprises at least two objects stacked vertically within the housing cavity to form a print bed stack. The housing may further comprise an aperture in a vertical wall of the housing, the aperture configured to accommodate a separator blade inserted into the power print bed to form a separation barrier between a first object at the top of the print bed stack and a second object that is adjacent and below the first object.

The medium may be an RFID device configured to convey a pointer field that identifies a location of one or more of the state information elements stored in a remote memory device within the powder bed fabrication system. The medium may be an optically perceivable designator configured to convey a pointer field that identifies a location of one or more of the state information elements stored in a remote memory device within the powder bed fabrication system.

In another aspect, the invention may be a powder bed fabrication system, comprising a build box subsystem. The build box subsystem may comprise a powder print bed characterized by state information. The state information may comprise one or more state information elements of (i) object identification, (ii) object location, (iii) object model information, (iv) object material composition state, (v) non-object material composition, (vi) object position/orientation, (vii) powder bed density, (viii) part quantity, (ix) packed density, (x) current processing, (xi) next subsystem processing step, (xii) previous subsystem processing step, (xiii) beginning to end process flow, (xiv) failure status, (xv) temperature profile, and (xvi) pressure profile. The build box subsystem may further comprise a medium configured to facilitate access to the state information, and a coupling interface for removably engaging the build box with at least one subsystem of the powder bed fabrication system. The powder bed fabrication system may further comprise a binder jet fabrication subsystem configured to apply binder material to the powder print bed, a de-powdering subsystem configured to remove unbound powder from the powder print bed, and a sintering furnace configured to apply energy, and thereby heat, to the printed object.

In an embodiment, the binder jet fabrication subsystem may be configured to (i) mechanically and electrically engage the build box subsystem, (ii) receive the data block from the build box system, (iii) evaluate the state information associated with the data block to determine if one or more procedural requirements is not satisfied; and (iv) perform an action when the one or more procedural requirements is determined to not be satisfied.

The action may operate to disable subsequent processing of the build box subsystem by the binder jet printing subsystem and provide a notification to an operator of the binder jet fabrication system.

The one or more procedural requirements may comprise a prerequisite step having been performed prior to performing an upcoming step. The one or more procedural requirements may comprise an upcoming machine being capable of processing the object. The one or more procedural requirements may comprise suitable materials for processing the object being available in an upcoming step.

In another aspect, the invention may be a method of tracking a build box subsystem that is processing an object within a powder bed fabrication system. The method may comprise mechanically and electrically engaging the build box subsystem with another subsystem of the powder bed fabrication system, and receiving, from the build box subsystem, a data block that represents state information associated with the build box subsystem. The method may further comprise evaluating the state information to determine if one or more procedural requirements is not satisfied, and performing an action when the one or more procedural requirements is determined to not be satisfied.

The action may comprise disabling subsequent processing of the build box subsystem by the binder jet printing subsystem and providing a notification to an operator of the binder jet fabrication system. The one or more procedural requirements may comprise a prerequisite step having been performed prior to performing an upcoming step. The one or more procedural requirements may comprise an upcoming machine being capable of processing the object. The one or more procedural requirements may comprise suitable materials for processing the object being available in an upcoming step.

In another aspect, the invention may be a powder bed fabrication system comprising a build box subsystem. The build box subsystem may comprise a powder print bed characterized by state information, the state information comprising one or more state information elements of (i) object identification, (ii) object location, (iii) object model information, (iv) object material composition state, (v) non-object material composition, (vi) object position/orientation, (vii) powder bed density, (viii) part quantity, (ix) packed density, (x) current processing, (xi) next subsystem processing step, (xii) previous subsystem processing step, (xiii) beginning to end process flow, (xiv) failure status, (xv) temperature profile, and (xvi) pressure profile. The build box subsystem may comprise a medium configured to facilitate access to the state information, and a coupling interface for removably engaging the build box with at least one subsystem of the powder bed fabrication system. The powder bed fabrication system may further comprise a three dimensional printing subsystem configured to selectively bind material within the powder print bed, a de-powdering subsystem configured to remove unbound powder from the powder print bed, and a sintering furnace configured to apply energy, and thereby heat, to the printed object.

In another aspect, the invention may be a method of tracking a build box subsystem that is processing one or more parts within a powder bed fabrication system. The method may comprise receiving, from the build box subsystem, state information associated with the build box subsystem, and incorporating the state information into a database. The method may further comprise receiving, from a user, a query concerning a particular part within the powder bed fabrication system, and returning, to the user, a report concerning at least one aspect of the particular part.

The method may further comprise compiling a map of a powder bed within the build box subsystem, the map comprising information about each layer of the powder bed. The method may further include evaluating the map of the powder bed, and taking an action as a result of the evaluating. The action may further comprise disposing of a part determined to be defective as a result of the evaluating. The action may further comprise mitigating a defect associated with a part determined to be defective as a result of the evaluating.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 2A and 2B show an example binder jet fabrication subsystem operating in conjunction with a build box according to the invention.

DETAILED DESCRIPTION

A description of example embodiments follows.

The teachings of all patents, published applications and references cited herein are incorporated by reference in their entirety.

The described embodiments are directed to a build box component of a powder bed fabrication system (also referred to herein as a binder jet fabrication system).

Figure 1:
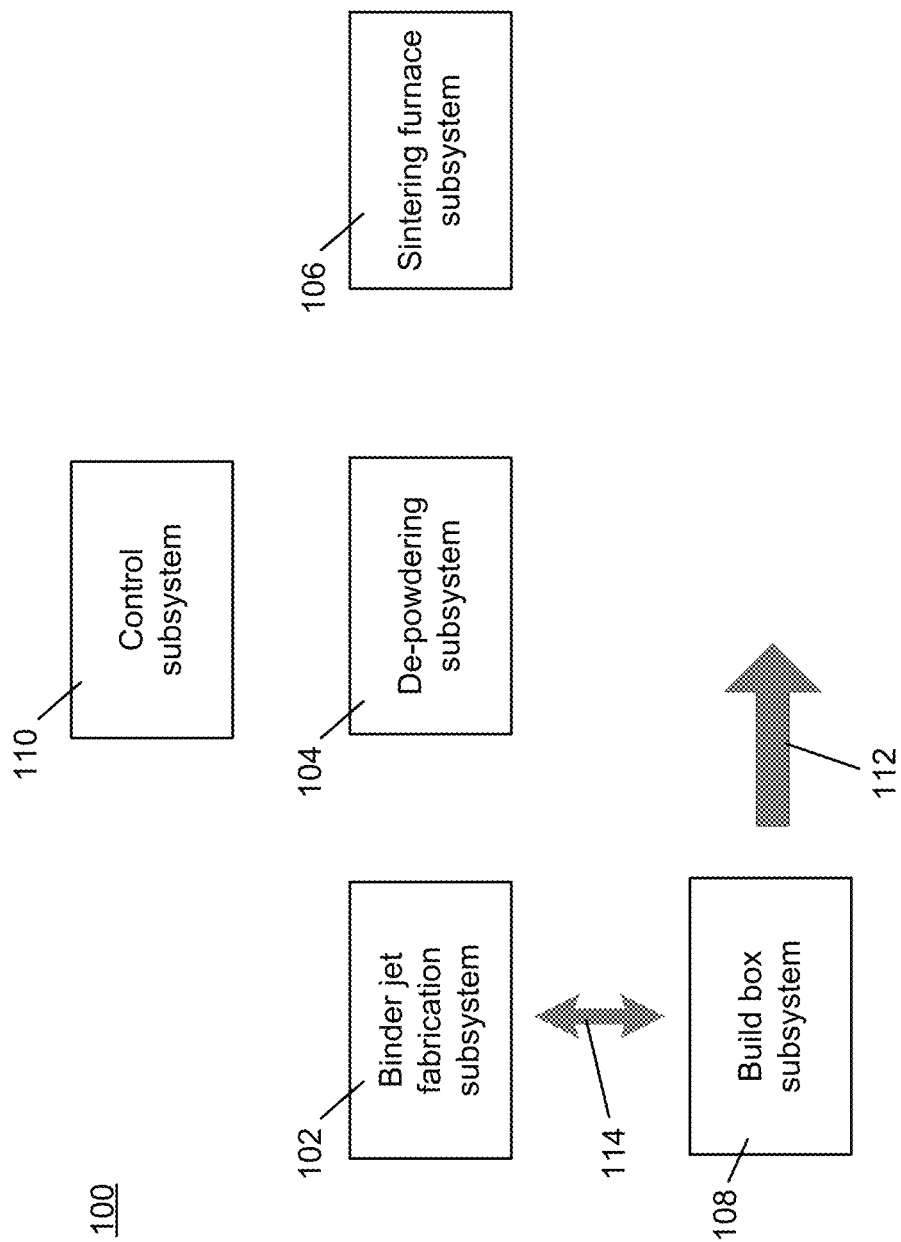
FIG. 1 shows an example powder bed fabrication system according to the invention.

FIG. 1 shows an example powder bed fabrication system 100, constructed and arranged according to the invention. A powder bed fabrication system 100 may comprise a binder jet fabrication subsystem 102, a de-powdering subsystem 104, a sintering furnace subsystem 106, a build box subsystem 108, and a control subsystem 110. As shown in FIG. 1, the build box subsystem 108 may be moved 112 within the powder bed fabrication system 100, to be associated 114 (mechanically, electrically, or both) with one of the binder jet fabrication subsystem 102, the de-powdering subsystem 104, or the sintering furnace subsystem 106, depending on the state of processing the object (or objects) within the build box subsystem 108. The control subsystem 110 may communicate with one or more of the binder jet fabrication subsystem 102, the de-powdering subsystem 104, the sintering furnace subsystem 106, and the build box subsystem 108 through, for example, a wired or wireless network architecture (not shown). The control subsystem 110 may monitor, coordinate and supervise the fabrication of the object(s) within the build box subsystem 108 as the build box subsystem 108 passes through the system 100. Further, the wired or wireless network architecture (not shown) may facilitate communication between any of the subsystems within the powder bed fabrication system 100.

Figure 2A:
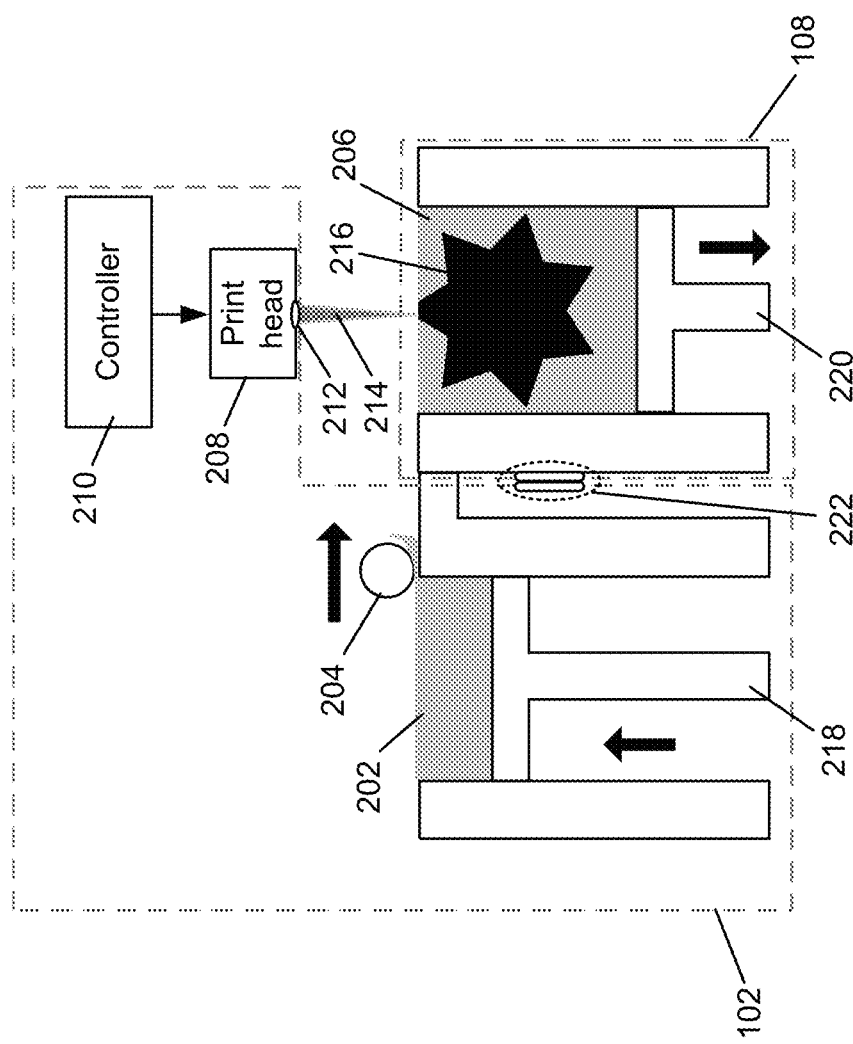

An example binder jet fabrication subsystem 102, operating in conjunction with a build box 108, is shown in FIGS. 2A and 2B. The binder jet fabrication subsystem 102 may include a powder supply 202, a spreader 204 (e.g., a roller) configured to be movable across the powder bed 206 of the build box subsystem 108, a print head 208 movable across the powder bed 206, and a controller 210 in electrical communication with the print head 208. The powder bed 206 may comprise, for example, micro-particles of a metal, micro-particles of two or more metals, or a composite of a one or more metals and other materials.

The spreader 204 may be movable across the powder bed 206 to spread a layer of powder, from the powder supply 202, across the powder bed 206. The print head 208 may comprise a discharge orifice 212 and, in certain implementations, can be actuated to dispense a binder material 214 (e.g., through delivery of an electric current to a piezoelectric element in mechanical communication with the binder 214) through the discharge orifice 212 to the layer of powder spread across the powder bed 206.

In operation, the controller 210 may actuate the print head 208 to deliver the binder material 214 from the print head 208 to each layer of the powder in a controlled two-dimensional pattern, as the print head 208 moves across the powder bed 206. In embodiments, the movement of the print head, and the actuation of the print head to deliver the binder material 214, may be coordinated with movement of the spreader 204 across the print bed 206. For example, the spreader may spread a layer of the powder across the print bed 206, and the print head may deliver the binder in a controlled, two-dimensional pattern, to the layer of the powder spread across the print bed, to form a layer of one or more three-dimensional objects 216. These steps may be repeated (e.g., with controlled two-dimensional pattern for each respective layer) in sequence to form subsequent layers until, ultimately, the one or more three-dimensional objects 216 are formed in the powder bed 206.

Although the example embodiment depicted in FIG. 2 includes a single object 216, it should be understood that the powder print bed 206 may include more than one object. Further, the powder print bed 206 may be delineated into two or more layers, stacked vertically, with one or more objects disposed within each layer. FIG. 2B illustrates an example of a powder bed 206 of a build box 108, with nested layers 206a, 206b, 206c, and one or more objects 216 within each layer.

An example binder jet fabrication subsystem 102 may comprise a powder supply actuator mechanism 218 that elevates the powder supply 202 as the spreader 204 layers the powder across the print bed 206. Similarly, the build box subsystem 108 may comprise a build box actuator mechanism 220 that lowers the powder bed 206 incrementally as each layer of powder is distributed across the powder bed 206. In another example embodiment, layers of powder may be applied to the powder print bed 206 by a hopper followed by a compaction roller. The hopper moves across the powder print bed, depositing powder along the way. The compaction roller follows the hopper, spreading the deposited powder to form a uniform layer of powder.

The binder jet fabrication subsystem 102 may couple to the build box subsystem 108 through a coupling interface 222 that facilitates removably engaging the build box subsystem 108 with the binder jet fabrication subsystem 102. The coupling interface may comprise one or more of (i) a mechanical aspect that provides for physical engagement, and (ii) an electrical aspect that supports electrical communication between the build box subsystem 108 to the binder jet fabrication subsystem 102. In some embodiments, the same coupling interface 222 may be used to engage the build box subsystem 108 to other subsystems of the powder bed fabrication system 100. In other embodiments, alternative mechanical and/or electrical interface provisions may be used to engage the build box subsystem 108 to subsystems other than the binder jet fabrication subsystem 102. The electrical interface component of the coupling interface 222 may be hard-wired, such as through a mating set of electrical connectors. Alternatively or in addition, the electrical interface component of the coupling interface may be a wireless connection. Alternatively or in addition, the electrical interface component of the coupling interface may be an optical connection, such as an optical scanner configured to read a bar code.

Figure 3B:
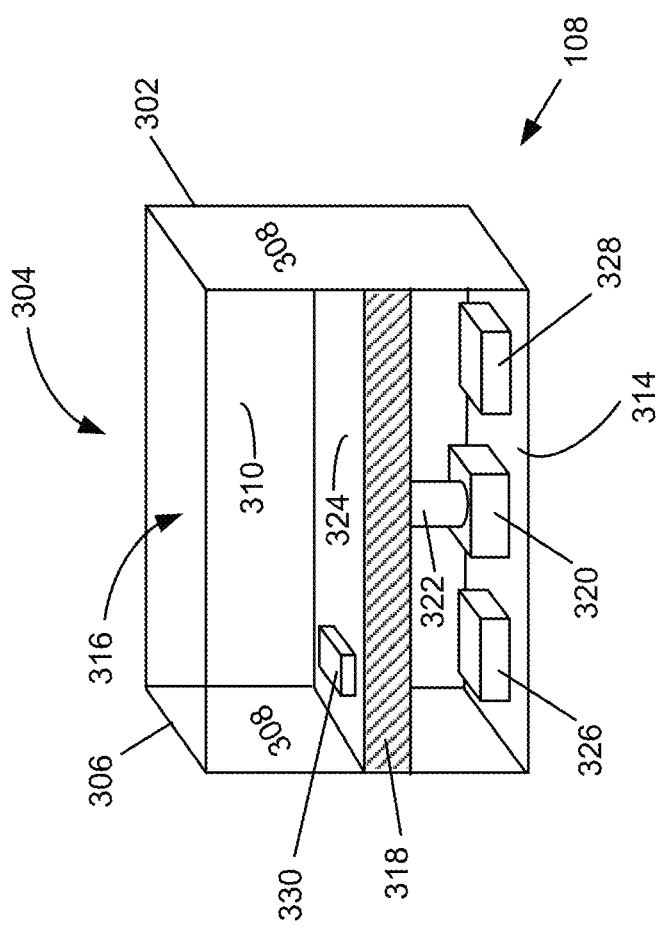
FIG. 3B illustrates a cut-away view of the build box shown in FIG. 3A.
Figure 3A:
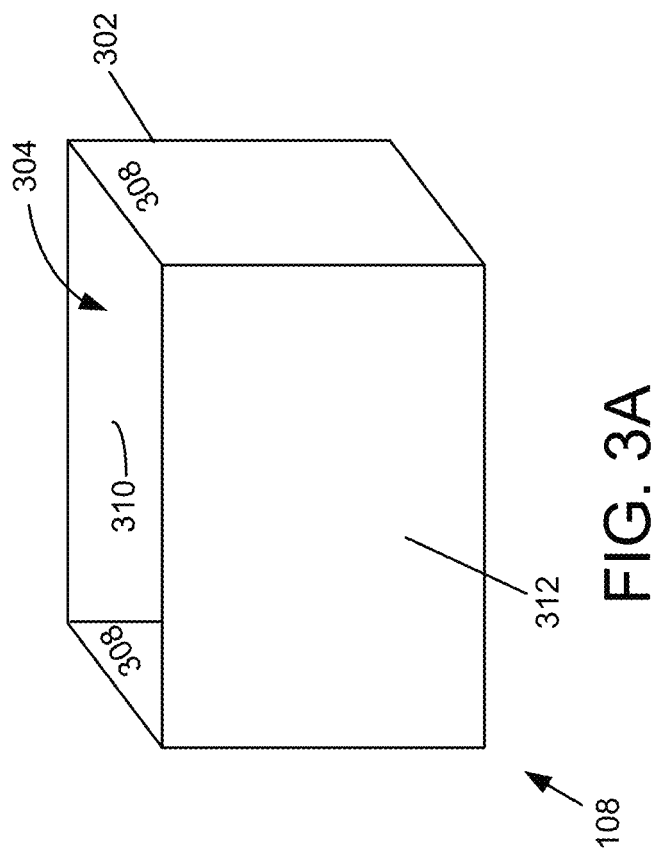
FIG. 3A illustrates an example build box according to the invention.

FIGS. 3A and 3B illustrate an example build box subsystem 108 according to the invention. FIG. 3A shows a perspective view of the build box subsystem 108. FIG. 3B is a cut-away view of the build box 108 shown in FIG. 3A, with the front portion of the build box subsystem cut away to show the interior portions of the build box subsystem 108. The build box subsystem 108 may include a housing 302 that defines a housing cavity 304 bounded by a top aperture 306, two side walls 308, a back wall 310, a front wall 312 and a bottom wall 314. As used herein, a "vertical wall" may generally describe any of the two side walls 308, the back wall 310 or the front wall 312. A powder print bed space 316 comprises a portion of the housing cavity 304, which extends from top aperture 306 to a movable housing floor 318. The powder print bed space 316 hosts the powder print bed 206 that is formed as the binder jet fabrication subsystem 102 incrementally layers powder from the powder supply 202 across the powder print bed space 316 (or by the hopper/compaction roller technique described herein).

The housing floor 318 is coupled to an actuator 320 through an actuating link 322. The build box actuator mechanism, described herein with respect to FIG. 2, comprises the housing floor 318, the actuator 320, and the actuating link 322.

In operation, the actuator 320 may initially situate the housing floor 318 such that the upper surface 324 of the build box floor 318 coincides with the top aperture 306. As the spreader 204 applies layers of powder across the top aperture 306, the actuator 320 incrementally lowers the housing floor 318 into the housing cavity 304, so as to form the powder print bed 316.

The powder print bed 316 formed within the housing cavity 304 may be characterized by descriptive information, referred to herein as state information. The state information may comprise a set of one or more state information elements, each of which specifies an aspect of the build box subsystem 108. The following is a list of example state information elements:

(a) Object identification state
    (b) Object location state
    (c) Object model information state
    (d) Object material composition state
    (e) Non-object material composition state
    (f) Object position/orientation state
    (g) Powder bed density state
    (h) Part quantity state
    (i) Packed density state
    (j) Current processing state
    (k) Next subsystem processing step state
    (l) Previous subsystem processing step state
    (m) Beginning to end process flow state
    (n) Failure status state related to build box subsystem or contents of build box subsystem
    (o) Temperature profile state
    (p) Pressure profile state This list is provided for descriptive purposes, and is not intended to be limiting. The powder bed state information may further comprise other state information relevant to the current state of the powder bed 206 and/or certain aspects of the build box 108.

The state information elements may further include a mapping of each powder layer of the build box, compiled as the powder layers are deposited on the print bed, and the binder material is applied. Such state information elements may be used to determine object-to-object defects and/or failure mechanisms that would inform depowdering procedures, defect tracking, and failure analysis. For example, the occurrence of a printer head clog during binder deposition may be captured in the layer mapping information, and subsequently used to identify an object failure and/or defect. Actions may be subsequently taken as a result of such failure indications. For example, one action may be disposing of a part determined to be defective. Alternatively, a part determined to be defective may be designated for reworking or otherwise mitigating the defect.

The object identification state information element may comprise information identifying the object (or objects) being fabricated within the powder print bed 316. The identification information may include, for example, a description of the object(s) (e.g., gear, valve housing), size and or shape of the object, customer identification (i.e., for whom the object is being fabricated), location of the object (and constituent parts of the object(s)) within the powder print bed 316, and other relevant descriptive information.

The object location state information element may comprise information concerning where the object(s), and the build box subsystem itself, is currently located within the production facility. In some embodiments, the object location state information may be derived from a location identification device disposed within the build box subsystem. For example, the location identification device may comprise a GPS receiver.

The object model information state information element may comprise information about the computer-aided design/computer-aided manufacturing (CAD/CAM) model upon which the object(s) being fabricated are based. The object model information state information may comprise only higher level model information such as model name, serial number and location of the model, or more detailed information, up to and including the complete design file of the object model.

The object material composition state information element may comprise information concerning the composition of the powder and/or the binding material and other constituent materials of the object(s) being fabricated within the powder bed 206.

The non-object material composition state information element may comprise information concerning the composition of the powder and/or the binding material and other constituent materials of regions of the powder bed 206 between the object(s) being fabricated.

Object position/orientation state information element may comprise information concerning the position of the object(s) within the build box 108 and the orientation of the object(s) within the build box subsystem 108, with respect to a reference coordinate system.

The powder bed density state information element may comprise information concerning density of the powder within the build box subsystem 108. In some embodiments, the density state information may be a single value that provides, for example, an average density across the entire powder bed. In other embodiments, the density state information may provide a three dimensional mapping of the powder bed density across layers of the powder print bed 316. The layers may be individual layers of deposited powder, or the layers may each be integer multiples of the individual layers of deposited powder.

The part quantity state information element may comprise information concerning the number of parts being fabricated within the build box subsystem 108.

The packed density state information element may comprise information concerning how closely the objects being fabricated are distributed throughout the powder print bed 316. The packed density state information element may also provide information regarding position and orientation of each object with respect to other objects.

The current processing state information element may comprise comprehensive information concerning, as of the current time, what procedures the object(s) being fabricated have undergone. For example, the current processing state information may describe a history of various parameters and processes experienced by the object(s). The parameter history may include temperature profile, time at each procedural step, and such. Process history may include a description of each previous processing step.

The next subsystem processing step state information element may comprise information concerning which processing step is due for the build box 108, according to an associated processing plan. For example, the next subsystem processing step state information may comprise information describing that the object is in transit to processing by the de-powdering subsystem 104.

The previous subsystem processing step state information element may comprise information concerning the last processing step experienced by the build box 108. For example, the next subsystem processing step state information may comprise information describing that the object has completed binder jet fabrication subsystem 102 processing.

Beginning to end process flow state information element may comprise information describing a planned process flow for the build box 108 and its contents.

The failure status state information element may comprise information relating to known failure conditions (e.g., print head clog that occurred during application of binder material) or conditions that are likely to promote a failure condition in the future (e.g., an improper temperature variation during a critical portion of the process). The latter failure status information may be used by the binder jet fabrication subsystem 102 to perform a predictive preventative maintenance analysis, through which potential failures of the build box 108 and its contents may be identified, remedied, and/or mitigated.

The temperature profile state information element may comprise information describing the temperature of the build box 108 and at various locations within the powder bed 206 at discrete points in time or as a continuous function of time. In some embodiments, the build box 108 itself may comprise heating elements that may be used to control, at least to some extent, the temperature of the build box and its contents.

It should be understood that the above-mentioned set of state information elements is an example presented for descriptive purposes, and is not intended to be limiting. Other state elements suitable for characterizing the build box 108 and constituent powder bed 316 may be used by the described embodiments instead of, or in addition to, the state information elements set forth herein.

The build box 108 may further include a controller/communications subsystem 326, and a medium 328 configured to facilitate access to the powder print bed state information by other components of the powder bed fabrication system 100. In the example embodiment depicted in FIG. 3B, the medium 328 may comprise a memory device configured to store a data block that represents the state information. The data block may comprise one or more data fields, each of which is configured to contain one of the state information elements. The controller/communications subsystem 326 may be configured to convey, through a wire-based or wireless transceiver system, the data block to one or more subsystems of the powder bed fabrication system.

Alternatively, the data block may comprise a pointer field containing information that points to one or more of the state information elements stored in a remote memory device, located within the powder bed fabrication system 100. Consider an example scenario in which the build box 108 is associated with the binder jet fabrication subsystem 102 to form an object 216 as described herein with respect to FIGS. 2A and 2B. In such a scenario, the binder jet fabrication subsystem 102 may request the pointer field from the build box 108 through the controller/communications subsystem 326. The request from the binder jet fabrication subsystem 102 may be accomplished by a communications subsystem—not shown—that is compatible with the controller/communications subsystem 326. The binder jet fabrication subsystem 102 may use the information from the pointer field to identify the location of the powder print bed state information, stored remotely, for example at the control subsystem 110 or a storage array network (SAN).

Alternatively, the medium 328 may be a radio-frequency identification (RFID) device disposed on or in the build box 108. The RFID device may provide, upon interrogation by an external transceiver, pointer information that points to one or more of the state information elements stored in a remote memory device, as described herein.

Alternatively, the medium 328 may be an optically perceivable designator (e.g., a bar code or quick response (QR) code) configured to convey pointer information that identifies a location of one or more of the state information elements stored in a remote memory device within the binder jet fabrication system 100, as described herein. The controller/communications subsystem 326 may be configured to convey the data block to one or more subsystems of the powder bed fabrication system.

The controller/communications subsystem 326 may also provide control signals, through an electrical coupling, to the actuator 320, to control the position of the housing floor 318 within the housing cavity 304.

In some embodiments, the controller/communications subsystem 326 may gather certain state information concerning the build box subsystem 108 and store the state information directly in the medium 328. Alternatively, the controller/communications subsystem 326 may convey the certain state information to another subsystem (e.g., the controller subsystem 110). The receiving subsystem may modify and/or add to the gathered state information to generate updated state information. The updated state information may be returned to the controller/communications subsystem 326, to be stored in the medium 328. The updated state information may be stored in a remote memory location, to be accessed through a pointer scheme as described herein.

Some embodiments of the build box 108 may include one or more transducers 330 configured to sense certain parameters of the build box 108 and produce a signal indicative of the sensed parameter(s). Examples of such parameters may include, but are not limited to, temperature, atmospheric pressure, atmospheric composition, atmospheric flow rate, position, velocity, acceleration, and orientation (e.g., with respect to a particular reference frame). The signal(s) indicative of the sensed parameter may be conveyed to the controller/communications subsystem 326, for organization, processing, storage in local storage media and/or communication to an external subsystem.

In some embodiments, the build box 108 may utilize the information gathered, as described herein, to determine an operational state of the build box 108 and its contents. Such a determination may be used by the build box 108 to make decisions regarding current and future processing. For example, the build box 108 may utilize the determined operational state to evaluate whether the build box contents should be inerted, or whether the build box should be removed from a subsystem load lock.

Figure 4:
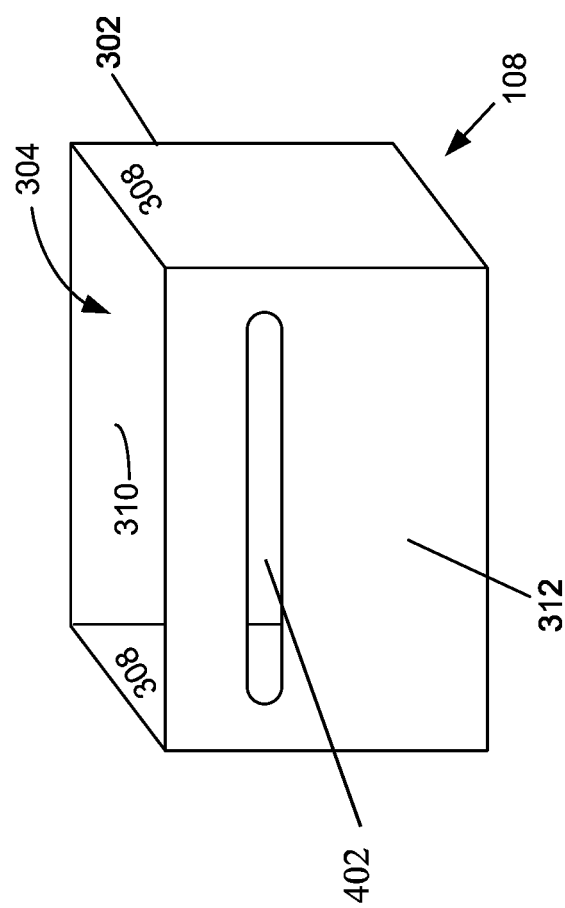
FIG. 4 shows an alternative example of a build box subsystem according to the invention.

As shown in FIG. 4, the build box subsystem 108 may include an aperture 402 within one of the front, back or side walls. In the example embodiment of FIG. 4, the aperture 402 is shown in the front wall 312. In some embodiments, the powder print bed may comprise at least two objects stacked vertically within the housing cavity to form a print bed stack. In such embodiments, the aperture may be configured to accommodate a separator blade, inserted into the power print bed, to form a separation barrier between a first object (or set of objects) at the top of the print bed stack and a second object (or set of objects) that is adjacent to and below the first object(s). The separation barrier may facilitate de-powdering operations, performed by the de-powdering subsystem 104, by reducing the powder bed volume in which the de-powdering subsystem 104 operates.

Figure 5:
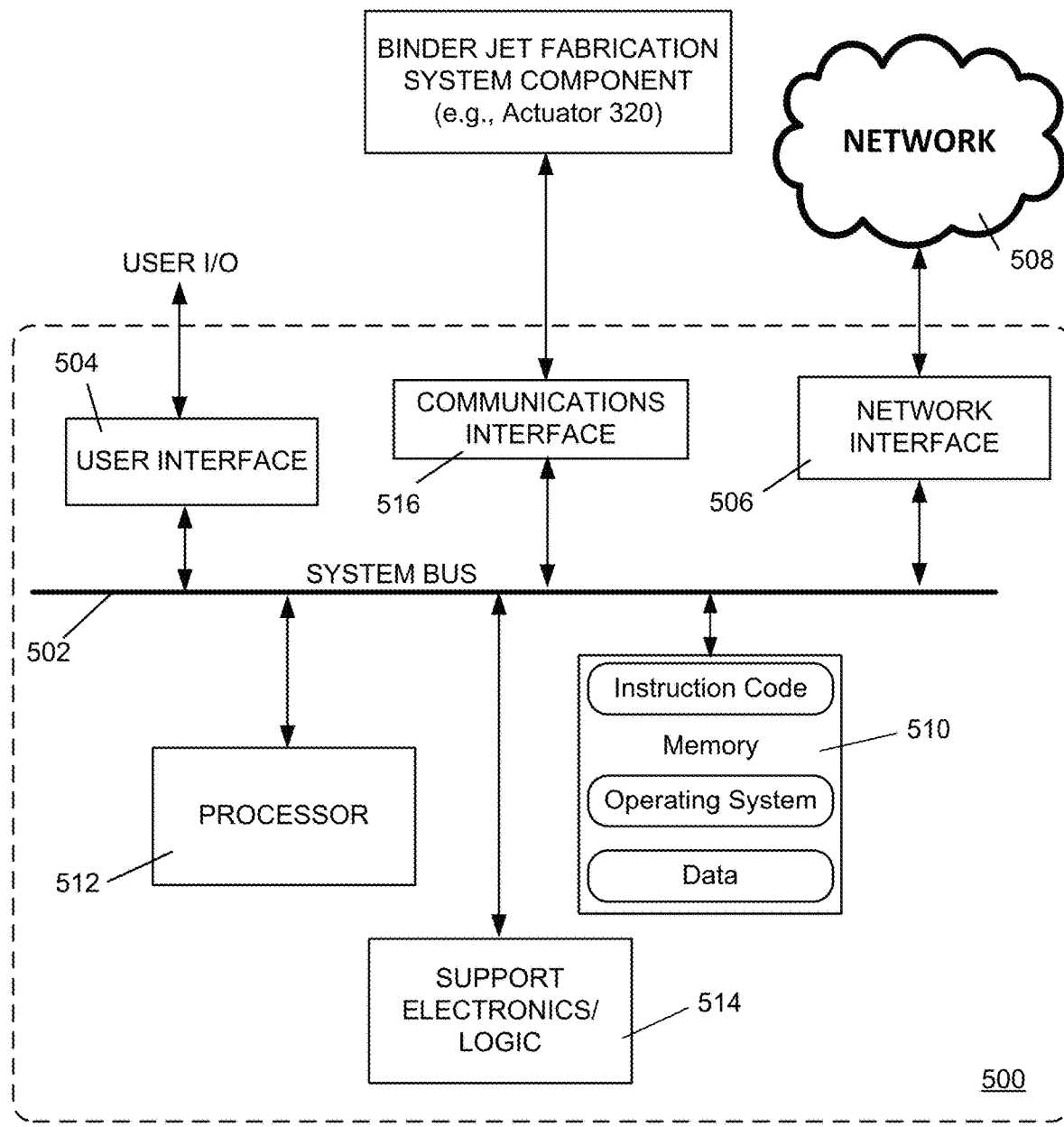
FIG. 5 is a diagram of an example internal structure of a processing system that may be used to implement one or more of the described embodiments.

FIG. 5 is a diagram of an example internal structure of a processing system 500 that may be used to implement one or more of the embodiments herein. The processing system may be used to implement, for example, one or more of the controller/communications subsystem 326 and/or the control subsystem 110. Each processing system 500 contains a system bus 502, where a bus is a set of hardware lines used for data transfer among the components of a computer or processing system. The system bus 502 is essentially a shared conduit that connects different components of a processing system (e.g., processor, disk storage, memory, input/output ports, network ports, etc.) that enables the transfer of information between the components.

Attached to the system bus 502 is a user I/O device interface 504 for connecting various input and output devices (e.g., keyboard, mouse, displays, printers, speakers, etc.) to the processing system 500. A network interface 506 allows the computer to connect to various other devices attached to a network 508. Memory 510 provides volatile and non-volatile storage for information such as computer software instructions used to implement one or more of the embodiments of the present invention described herein, for data generated internally and for data received from sources external to the processing system 500.

A central processor unit 512 is also attached to the system bus 502 and provides for the execution of computer instructions stored in memory 510. The system may also include support electronics/logic 514, and a communications interface 516. The communications interface may facilitate, for example, the electrical coupling between the actuator 320 and the controller/communications subsystem 326 described with reference to FIG. 3B.

In one embodiment, the information stored in memory 510 may comprise a computer program product, such that the memory 510 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

Figure 6:
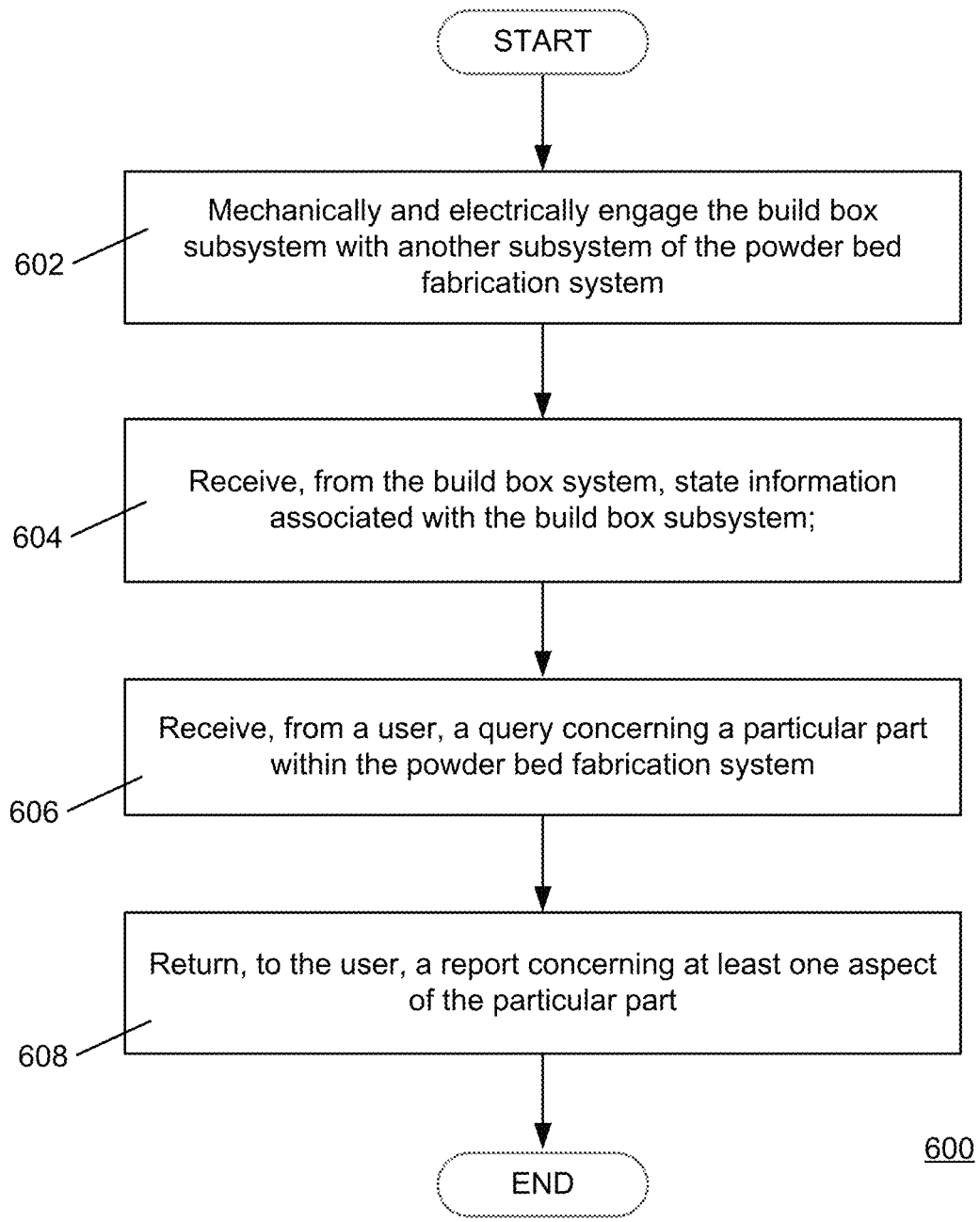
FIG. 6 illustrates a flow diagram describing an example embodiment according to the invention.

FIG. 6 illustrates a flow diagram describing an example embodiment according to the invention. A method of tracking a build box subsystem that is processing one or more parts within a powder bed fabrication system may comprise mechanically and electrically engaging 602 the build box subsystem with another subsystem of the powder bed fabrication system. The method may further include receiving 604, from the build box system, state information associated with the build box subsystem. The method may also include receiving 606, from a user, a query concerning a particular part within the powder bed fabrication system, and returning 608, to the user, a report concerning at least one aspect of the particular part.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A build box for an additive manufacturing system, the build box comprising:
   a housing having a plurality of side walls and a floor, the plurality of side walls and the floor cooperatively defining a powder print bed configured to contain one or more printed parts;
   an actuator configured to move the floor along a vertical axis of the housing, wherein a volume of the powder print bed increases as the floor is moved along the vertical axis;
   a transceiver operably coupled to a memory and configured to at least one of receive or transmit the information relating to the one or more printed parts to at least one subsystem of the additive manufacturing system;
   at least one aperture formed in a side wall of the housing; and
   a separator blade inserted into the powder print bed through the at least one aperture, the separator blade extending across the powder print bed and partitioning the powder print bed into a first area of the powder print bed located on a first side of the separator blade, and a second area of the powder print bed located on a second side of the separator blade.

2. The build box according to claim 1, wherein the at least one subsystem of the additive manufacturing system is one or more of a central server, a user device, a binder jet fabrication subsystem, a de-powdering subsystem, or a sintering furnace.

3. The build box according to claim 1, wherein the transceiver is a radio-frequency identification (RFID) device or an optically perceivable designator.

4. The build box according to claim 1, further comprising:
   a display operably coupled to the build box and configured to display the information relating to the one or more printed parts; and
   a user interface operably coupled to the build box and configured to receive a user input for displaying the information relating to the one or more printed parts.

5. The build box according to claim 1, wherein the information relating to the one or more printed parts is accessible both when the build box is directly coupled to the at least one subsystem of the additive manufacturing system and when the build box is not directly coupled to the at least one subsystem of the additive manufacturing system.

6. The build box according to claim 1, wherein the information relating to the one or more printed parts includes one or more of a part identification, a part location in the powder print bed, a part model information, a part material composition state, a non-part material composition, a part position or orientation in the powder print bed, a powder bed density, a part quantity, a packed density, a current processing, a next subsystem processing step, a previous subsystem processing step, a beginning to end process flow, a failure status, a temperature profile, or a pressure profile.

7. The build box according to claim 1, further comprising:
   one or more sensors configured to detect at least some of the information relating to the one or more printed parts and to communicate the information relating to the one or more printed parts to the memory.

8. The build box according to claim 1, further comprising:
a coupling interface for removably engaging the build box with the at least one subsystem of the additive manufacturing system.

9. A build box for an additive manufacturing system, the build box comprising:
a housing having a plurality of side walls and a floor, and an opening on an upstream side of the housing opposite the floor;
a powder print bed defined by the plurality of side walls and the floor, wherein the powder print bed is configured to contain one or more printed parts;
an actuator configured to move the floor along a vertical axis of the housing, wherein a volume of the powder print bed increases as the housing floor is moved along the vertical axis;
a radio-frequency identification (RFID) device configured to store information relating to the one or more printed parts; and
a coupling interface for removably engaging the build box with at least one subsystem of the additive manufacturing system; and
an aperture in one or more of the plurality of side walls.

10. The build box according to claim 9, further comprising:
a display operably coupled to the build box and configured to display the information relating to the one or more printed parts; and
a user interface operably coupled to the build box and configured to receive a user input for displaying the information relating to the one or more printed parts.

11. The build box according to claim 9, further comprising:
a transceiver operably coupled to a memory and configured to at least one of receive or transmit the information relating to the one or more printed parts to at least one subsystem of the additive manufacturing system.

12. The build box according to claim 11, wherein the at least one subsystem of the additive manufacturing system is one or more of a central server, a user device, a binder jet fabrication subsystem, a de-powdering subsystem, or a sintering furnace.

13. The build box according to claim 11, wherein the information relating to the one or more printed parts is accessible both when the build box is directly coupled to the at least one subsystem of the additive manufacturing system and when the build box is not directly coupled to the at least one subsystem of the additive manufacturing system.

14. The build box according to claim 9, further comprising:
a separator blade inserted into the powder print bed through the aperture, the separator blade extending across the powder print bed and partitioning the powder print bed into a first area of the powder print bed located on a first side of the separator blade, and a second area of the powder print bed located on a second side of the separator blade.

15. The build box according to claim 9, wherein the information relating to the one or more printed parts includes one or more of a part identification, a part location in the powder print bed, a part model information, a part material composition state, a non-part material composition, a part position or orientation in the powder print bed, a powder bed density, a part quantity, a packed density, a current processing, a next subsystem processing step, a previous subsystem processing step, a beginning to end process flow, a failure status, a temperature profile, or a pressure profile.

16. The build box according to claim 11, wherein the information relating to the one or more printed parts is accessible both when the build box directly is coupled to the at least one subsystem of the additive manufacturing system and when the build box is not directly coupled to the at least one subsystem of the additive manufacturing system.

17. The build box according to claim 11, further comprising:
one or more sensors configured to detect at least some of the information relating to the one or more printed parts and to communicate the information relating to the one or more printed parts to a memory.

* * * * *